United States Patent
Bryngelson et al.

(10) Patent No.: US 12,442,490 B2
(45) Date of Patent: Oct. 14, 2025

(54) FLEXIBLE REGASIFICATION FACILITY AND METHODS OF OPERATION

(71) Applicant: WAVECREST ENERGY, LLC, The Woodlands, TX (US)

(72) Inventors: Robert Bryngelson, The Woodlands, TX (US); Ray Gagliardi, The Woodlands, TX (US); Graeme Trotter, The Woodlands, TX (US); Kenneth McGeachie, The Woodlands, TX (US); Charles E. Ruehl, Jr., The Woodlands, TX (US); Daniel Isaacson, The Woodlands, TX (US); Matthew Migliozzi, The Woodlands, TX (US)

(73) Assignee: WAVECREST ENERGY, LLC, The Woodlands, TX (US)

( * ) Notice: Subject to any disclaimer, the term of this patent is extended or adjusted under 35 U.S.C. 154(b) by 0 days.

(21) Appl. No.: 18/938,539

(22) Filed: Nov. 6, 2024

(65) Prior Publication Data
US 2025/0146625 A1   May 8, 2025

Related U.S. Application Data (60) Provisional application No. 63/547,759, filed on Nov. 8, 2023.

(51) Int. Cl.
*F17C 7/04* (2006.01)

(52) U.S. Cl.
CPC .......... *F17C 7/04* (2013.01); *F17C 2221/033* (2013.01); *F17C 2227/0135* (2013.01);
(Continued)

(58) Field of Classification Search
CPC ............... F17C 7/04; F17C 2221/033; F17C 2227/0135; F17C 2265/05; F17C 2270/011; F17C 2270/0118; F17C 2270/0136
(Continued)

(56) References Cited

U.S. PATENT DOCUMENTS 6,298,671 B1 * 10/2001 Kennelley ............... F17C 1/007
62/50.2
10,532,795 B2   1/2020 Laird et al.
(Continued)

FOREIGN PATENT DOCUMENTS

CN      202546254       11/2012
CN      206159820 U  *  5/2017
(Continued)

OTHER PUBLICATIONS

KR 20190124000 A—English Translation (Year: 2019).*
(Continued)

*Primary Examiner* — Craig M Schneider
*Assistant Examiner* — Christopher M Afful
(74) *Attorney, Agent, or Firm* — Womble Bond Dickinson (US) LLP (57) ABSTRACT

A regasification facility, regasification systems and methods for import, offloading and regasification of liquid natural gas from liquid natural gas carriers is provided. The regasification facility is configured to provide increased flexibility in the construction so as to enable substantial reductions in construction times and costs of the construction of the regasification facility to be constructed and brought into operation, and to be further scaled up quickly and efficiently versus traditionally constructed and operated land based regasification plants and/or floating storage and regasification units.

20 Claims, 5 Drawing Sheets

(52) U.S. Cl.
CPC ..... *F17C 2265/05* (2013.01); *F17C 2270/011* (2013.01); *F17C 2270/0118* (2013.01); *F17C 2270/0136* (2013.01)

(58) Field of Classification Search
USPC .......................................................... 141/11
See application file for complete search history.

(56) References Cited

U.S. PATENT DOCUMENTS

| | | |
|---|---|---|
| 11,933,458 B1* | 3/2024 | Fairy .................. F17C 5/06 |
| 2006/0010911 A1 | 1/2006 | Hubbard et al. |
| 2008/0264100 A1 | 10/2008 | Mak et al. |
| 2010/0205979 A1* | 8/2010 | Gentry .................. F17C 9/04 62/53.2 |
| 2018/0363848 A1 | 12/2018 | Lokken et al. |
| 2020/0156924 A1* | 5/2020 | Thieu .................. B67D 7/36 |
| 2021/0131612 A1 | 5/2021 | Lukawski et al. |

FOREIGN PATENT DOCUMENTS

| | | | |
|---|---|---|---|
| EP | 1918630 | | 5/2008 |
| EP | 1490625 | | 8/2011 |
| KR | 20190124000 A | * | 11/2019 |
| WO | 2013109149 | | 7/2013 |
| WO | 2017200388 | | 11/2017 |

OTHER PUBLICATIONS

CN 206159820 U—English Translation (Year: 2017).*
European Patent Office, International Search Report and Written Opinion for PCT/US2024/054821, Feb. 11, 2025.

* cited by examiner

FLEXIBLE REGASIFICATION FACILITY AND METHODS OF OPERATION

CROSS-REFERENCE

The present co-pending application claims the benefit of U.S. Provisional Patent Application No. 63/547,759, filed Nov. 8, 2023.

INCORPORATED BY REFERENCE

The disclosure made in U.S. Provisional Patent Application No. 63/547,759, filed Nov. 8, 2023, is specifically incorporated by reference herein as if set forth in its entirety.

TECHNOLOGY FIELD

The present disclosure generally relates to regasification facilities and systems and methods for regasification of liquid natural gas. More particularly, the present disclosure is directed to embodiments of a flexible regasification facility and systems and associated methods for offloading and regasification of liquid natural gas, which are adapted to enable flexibility and reductions in time and costs of construction and operation thereof.

BACKGROUND

The following Background section is intended to provide a general discussion of existing systems for offloading and regasification of liquid natural gas (LNG) to convert the LNG to a gaseous form of natural gas for delivery to a downstream destination, such as a power plant, gas distributor, or other destination. Accordingly, it should be understood that this section is intended solely to provide general background understanding of the field, and is not to be taken as an admission of prior art.

Natural gas is commonly used as a fuel source for the generation of power and heat and often is exported to overseas countries or locations where there is not an existing abundant supply of natural gas by large carrier vessels known as LNG carriers (LNGCs). For transport, the natural gas generally will be converted to a liquid state and stored in cryogenic storage tanks aboard the LNGC, after which the LNGC will transport its cargo of LNG to its destination where the LNG will be offloaded to a large-scale storage facility for future conversion of the liquid natural gas back to its gaseous state.

Traditional regasification plants have included land-based regasification plants designed to receive, store and process large volumes of LNG. Such land-based regasification plants generally require a large land footprint, and are constructed with large scale LNG storage tanks sized to receive and store an offload of substantially an entire cargo of LNG from one or more LNGCs so as to enable LNGCs to arrive at a terminal for the land-based regasification plant, discharge their cargo of LNG to such large scale LNG storage tanks and then depart within an approximately twenty-four hour period. Given the size and storage capacities required, such large-scale LNG storage tanks generally must be constructed onsite, which substantially increases the costs of construction of such land-based regasification plants as well as increasing the time and labor required to complete construction of these plants. Moreover, due to the typical regasification production rates at which such land-based regasification plants are designed to operate, very frequent deliveries of LNG are required to justify the time and expense of construction and the operation of these plants. However, in many locations, demand for natural gas can fluctuate with seasons, such that substantially constant operation of such large land-based regasification plants may not be necessary or cost effective.

As an alternative, floating storage and regasification units (FSRUs) have been developed as a lower cost alternative solution for offloading and regasification of LNG from LNGCs. FSRUs were initially designed to provide a lower cost alternative to larger scale land-based regasification plants by utilizing the FSRUs' onboard LNG storage tanks as storage for the LNG, and installing LNG regasification equipment onboard the FSRU, which previously could be done at a lower cost and with shorter construction times versus land-based regasification plants requiring larger footprints and components, such as their much larger scale LNG storage tanks, that had to be constructed onsite. A tradeoff of the FSRUs versus land-based regasification plants has been an increase in operational cost and lower regasification production rates. More recently, however, the costs of construction of FSRUs further increased dramatically, as have the lead times required for construction of FSRUs, in some cases now, extending out for over three to four years. As a result, processing of frequent deliveries of LNG are required to justify the time and expense of construction and the operation of these plants similar to large land-based regasification.

Accordingly, it can be seen that a need exists for regasification facilities, systems and methods for the offloading and regasification of LNG that can be constructed in a more timely manner and with substantially reduced construction costs, and with such regasification facilities and systems being configured to be flexible and scalable to enable expansion of production capacity as needed. It is to these and other related and unrelated issues in the art that the present disclosure is directed.

SUMMARY

Briefly described, the present disclosure is directed to embodiments of a regasification facility, and to systems and methods for offloading and regasification of LNG from an LNG carrier. In some aspects, the present disclosure is directed to embodiments of an LNG regasification facility adapted to provide increased flexibility in the construction thereof so as to enable substantial reductions in construction times and costs of the construction, enabling the regasification facility to be constructed and brought into operation within a shorter timeframe and with reduced construction costs, versus the lengthy construction times and costs of traditional land-based regasification plants and/or FSRUs.

In embodiments, the regasification facility of the present disclosure can have a substantially modular construction, including various components that can be constructed or manufactured off-site and then transported and assembled together at a construction site for the regasification facility, which can help reduce on-site construction costs and overall construction times for the regasification facility. For example, in embodiments, the regasification facility can utilize one or more reduced capacity storage tanks that can be prefabricated at a remote location and then transported and installed at a location or regasification site, rather than requiring construction of large scale LNG storage tanks (e.g., LNG storage tanks with capacities necessary to enable off load of substantially a full cargo of LNG from one or more LNGCs) at the regasification terminal site.

In embodiments, the regasification facility can include at least one LNG storage mechanism (which may include one or more, or any combination of, an LNG storage tank, LNG ISO container, floating storage units (FSUs), floating barges, or other onshore or offshore storage apparatus) that can be configured, combined, fabricated, or otherwise operated as an LNG storage mechanism. In embodiments, the at least one LNG storage mechanism can have a capacity that is less than traditional land-based LNG storage tanks, as well as being less than an LNG cargo capacity of a traditional LNGC. Other components, such as vaporizers, heating chambers and heating systems for a regasification train of a regasification system, one or more gas metering systems, etc., of the regasification facility also can comprise modular assemblies or components that can be separately manufactured and thereafter obtained and assembled onsite such that the initial site footprint required for the regasification facility can be reduced, further enabling a reduction of costs.

In addition, in embodiments, the regasification facility is further configured to provide a flexible design that enables additional LNG storage mechanisms, vaporizers, heaters, etc. to be added/installed as needed to increase the capacity of the regasification facility as needed, such that the regasification facility can be more cost effectively scaled up post-construction to meet additional demand without requiring a substantial expansion of the overall footprint of the regasification facility or construction of additional LNG storage mechanisms on-site.

In embodiments, an LNGC can be received at a dock or mooring terminal for the regasification facility. An offloading system can connect the onboard LNG storage tanks of the LNGC to one or more conduits of an intake system of the regasification facility, with onboard pumps of the LNGC being operated to pump the LNG from the onboard LNG storage tanks of the LNGC into the intake system for supply of the LNG to a regasification system.

In embodiments, the offloading of the LNG from the onboard LNG storage tanks of the LNGC is used by the regasification facility to feed a supply of the offloaded LNG directly to the regasification system of the regasification facility. In addition, in embodiments, as the LNG is offloaded, an additional or second portion of the offloaded LNG can be selectively diverted to at least one onshore LNG storage mechanism. In some embodiments, the flow of LNG being offloaded can be monitored (e.g., by a facility control system) and controlled such that a first portion of LNG being supplied directly to the regasification system, and the second portion of the LNG that is being diverted to the at least one onshore LNG storage mechanism, can be varied, such as based upon regasification rates or production capacity of the regasification system, to enable greater or lesser volumes of LNG to be fed directly to the regasification system, and correspondingly, to divert lesser or greater volumes of LNG to the at least one onshore LNG storage mechanism. As a result, the pumps of the LNGC thus can be run at substantially full capacity while substantially reducing the need to operate the pumps in a "recirculation mode" to accommodate the lower regasification rates or production rates of the regasification system.

In embodiments, once the at least one LNG storage mechanism has been filled to an established threshold capacity or otherwise filled to a predetermined capacity established for continuing regasification operations (e.g., for at least a selected period of time such as 4-8 hours or possibly longer), the regasification facility operator shall have the option to elect (i) to shut down the LNGC cargo pumps and the regasification facility can be fed by the at least one LNG storage mechanism until it has been emptied or the amount of LNG therein falls below an established threshold capacity for continued regasification operations, or as directed by the regasification facility operator, at which time the LNGC can restart its pumps to continue to offload its cargo of LNG, or (ii) to operate the LNGC cargo pumps until the LNGC onboard LNG storage tanks are emptied or until the LNGC cargo pumps are otherwise shut down, at which time the regasification facility can be fed by the at least one LNG storage mechanism. In embodiments, the at least one LNG storage mechanism can be configured with a sufficient LNG storage capacity to supply LNG to the regasification system to enable substantially continuous operation of the regasification system for a selected time period. For example, in embodiments, the at least one LNG storage mechanism can have a capacity sufficient to supply approximately four to eight hours or more of LNG to the regasification system at a selected or desired baseload regasification capacity or production rate.

In addition, by selectively controlling the direct supply of the first portion of LNG to the regasification system and the diversion of at least the second portion LNG to the at least one LNG storage mechanism boil off gas, which is generated both in the at least one onshore LNG storage mechanism as well as in the onboard storage tanks of the LNGCs, can be managed. For example, in embodiments, the first portion of the LNG being fed directly to the regasification system can be passed through a re-condenser where it comes into contact with the boil off gas which then is condensed back to LNG, and diverted to the regasification system. In addition, in embodiments, boil off gas from the at least one LNG storage mechanism or the LNGC storage tanks can be recondensed similar to the boil off gas from the LNGC or pressurized via a compressor and delivered directly to a natural gas export or output delivery system from the LNGC storage tank(s) or at least one LNG storage mechanism.

In embodiments, the regasification system can include at least one heating mechanism such as a gas fuel heater configured to heat the boil off gas for combustion by one or more vaporizers of the regasification system. In some embodiments, excess boil off gas can be diverted back to the LNGC, where it can be used as a fuel source, for example, for driving operation of the LNGC pumps. Thus, in embodiments, the regasification facility can enable a substantial portion or substantially all of the boil off gas to be utilized.

In embodiments, the heat generated from the combustion of the boil off gases can be used by the one or more vaporizers to heat LNG passing therethrough, causing the LNG to be converted from its liquid state back to a gaseous state. Thereafter, the regasified natural gas can be directed through a gas metering system that controls output of the natural gas through a natural gas export or output delivery of the regasification facility. If necessary, in some embodiments, nitrogen can be injected into the regasified natural gas before it is exported to allow for a broader range of LNG cargos to be accepted at the facility.

In embodiments, once the onshore at least one LNG storage mechanism has been substantially filled to capacity or otherwise established as available for regasification operations, the regasification facility operator can have an option to elect (i) to shut down the LNGC cargo pumps and the regasification facility can be fed by the at least one LNG storage mechanism until it has been emptied or otherwise as directed by the regasification facility operator, at which time the LNGC can restart its pumps to continue to offload its cargo of LNG, or (ii) to operate the LNGC cargo pumps until the LNGC onboard LNG storage tanks are emptied or until the LNGC cargo pumps are otherwise shut down, at which time the regasification facility can be fed by the at least one LNG storage mechanism. This enables the LNGC carrier to comply with regulations regarding crew rest hours, while at the same time, can enable the LNGC carrier to employ a smaller onboard crew, address requisite maintenance, and address other scheduled or unscheduled downtime. However, the regasification system can continue to operate, drawing LNG directly from the at least one LNG storage mechanism.

In addition, various aspects of the present disclosure include a method for offloading and regasification of LNG, comprising: connecting at least one LNGC to an intake system of a regasification terminal; supplying a flow of LNG from at least one LNGC to the intake system using one or more onboard pumps of the LNGC; feeding a first portion of the flow of LNG directly to at least one regasification system; diverting a second portion of the flow of LNG to at least one LNG storage mechanism, wherein the at least one LNG storage mechanism is in communication with the at least one regasification system and has a capacity to supply LNG to at least one regasification system for a selected period of time; and subjecting the LNG to vaporization to convert the LNG to a gaseous state natural gas.

In embodiments, the method can further comprise discontinuing operation of the one or more pumps of the at least one LNGC when the at least one LNG storage mechanism reaches a selected storage quantity of LNG, and supplying additional LNG from the at least one LNG storage mechanism to the at least one regasification system.

In embodiments of the method, diverting the second portion of the flow of LNG to the at least one LNG storage mechanism comprises diverting a selected volume of LNG based on a regasification rate of the at least one regasification system.

In some embodiments of the method, the one or more pumps of the at least one LNGC can comprise a plurality of pumps, and further comprising discontinuing operation of at least one pump of the plurality of pumps when the at least one LNG storage mechanism reaches a selected storage quantity of LNG.

In embodiments, the method can further comprise stopping diversion of the second portion of LNG to the at least one LNG storage mechanism when the at least one LNG storage mechanism reaches a selected storage quantity, and continuing operation of the one or more pumps of the at least one LNGC to supply LNG to the at least one regasification system until such LNGC storage tanks have been substantially emptied.

In embodiments, the method can further comprise discontinuing operation of the one or more pumps of the at least one LNGC and when the LNGC storage tanks have been substantially emptied, and supplying LNG from the at least one LNG storage mechanism to the at least one regasification system.

In embodiments, the method can further comprise transferring fuel gas, from the at least one LNG storage mechanism to a natural gas export or output delivery system.

In some embodiments, the method can further comprise burning fuel gas, boil off gas, or otherwise vaporized gas to generate heat for vaporization of the LNG.

In other embodiments, the method can further comprise diverting a portion of fuel gas, boil off gas, or otherwise vaporized gas to the LNGC.

In embodiments, the method can further comprise exporting the gaseous state natural gas. In some embodiments, exporting the natural gas comprises blending the gaseous state natural gas with nitrogen.

In still other embodiments of the method, supplying the flow of LNG from the at least one LNGC comprises pumping a flow volume of LNG that is equal to or greater than a regasification capacity of the at least one regasification system.

In embodiments, the at least one LNG storage mechanism can comprise one or more, of, an LNG storage tank, LNG ISO container, FSUs, floating barges, or other onshore or offshore storage apparatus, or combinations thereof, that are configured for storage of LNG.

In addition, in embodiments, the at least one regasification system can comprise one or more regasification modules or trains fabricated, transported, and installed in communication with an onshore storage mechanism, floating barge, FSRU, floating platform vessel, or other onshore or offshore storage mechanism, or combinations thereof, as part of a regasification system.

In another aspect, a method of constructing a regasification facility is provided, comprising: fabricating one or more LNG storage mechanisms; transporting the one or more LNG storage mechanisms and a plurality of modular components of at least one regasification system, to a site adjacent to a regasification terminal configured to receive one or more LNGCs and offload a flow of LNG therefrom; assembling the one or more LNG storage mechanisms and the modular components of the at least one regasification system at the site; coupling the at least one regasification system to an intake system, at least one gas metering system, and a natural gas export or output delivery system at the site; and linking the at least one regasification system and the one or more LNG storage mechanisms to the regasification terminal via the intake system; wherein the intake system is configured to receive the flow of LNG from one or more LNGCs and feed at least a first portion of the flow of LNG to the at least one regasification system and divert a second portion of LNG in excess of a regasification capacity of the at least one regasification system to the one or more LNG storage mechanisms.

According to another aspect, a method of constructing a regasification terminal is provided, comprising fabricating one or more LNG storage mechanisms; wherein the one or more LNG storage mechanisms have a storage capacity lower than a storage capacity of a conventional regasification facility; transporting the one or more LNG storage mechanisms, one or more vaporizers, one or more heating system, and one or more gas metering systems to the regasification facility; and assembling the one or more LNG storage mechanisms, one or more vaporizers, one or more heating system and one or more gas systems at the regasification terminal.

In embodiments, the one or more LNG storage mechanisms can comprise at least one onshore storage tank, a floating barge, FSRU, FSU, a floating platform vessel, or combinations thereof.

In embodiments, the at least one regasification system is constructed with an initial regasification or production capacity, and the method further comprises adding at least one additional regasification train, at least one additional vaporizer, or combinations thereof, to increase the capacity of the regasification terminal.

According to a further aspect, a method of constructing a regasification facility comprises fabricating one or more LNG storage mechanisms; transporting the one or more LNG storage mechanisms, one or more vaporizers and one or more heating systems for construction of at least one regasification system, and one or more gas metering systems to a site adjacent to a regasification terminal configured to receive one or more LNGCs for offloading a flow of LNG therefrom; assembling the one or more LNG storage mechanisms, the one or more vaporizers and one or more heating systems of the at least one regasification system, an intake system, the one or more gas metering systems, and a natural gas export or output delivery system at the site; connecting the at least one regasification system and the one or more LNG storage mechanisms to the regasification terminal via the intake system; and wherein the intake system is configured to receive the flow of LNG for feeding at least a portion of the flow of LNG to the at least one regasification and divert LNG in excess of a regasification capacity of the at least one regasification system to the one or more LNG storage mechanisms.

In embodiments, the method further comprises fabricating at least one LNG storage mechanism at the regasification facility.

In some embodiments, the method further comprises installing one or more additional LNG storage mechanisms, one or more additional vaporizers, one or more additional heating systems, and one or more additional gas metering systems at the regasification facility to increase a regasification capacity thereof.

In additional embodiments, the regasification can further comprise a facility control system including programming or instructions configured to monitor the second portion of the flow of LNG being diverted to the at least one LNG storage mechanism and a storage capacity of the at least one LNG storage mechanism and in response to the storage capacity of the at least one LNG storage mechanism falling below an established threshold capacity, selectively: (i) direct the LNGC to shut down one or more LNGC cargo pumps and supply a flow of stored LNG to the at least one regasification system from the at least one LNG storage mechanism until the storage capacity of the at least one LNG storage mechanism exceeds an established threshold capacity; or (ii) suspend diversion of the second portion of LNG to the at least one LNG storage mechanism, and continue to operate the one or more LNGC cargo pumps until one or more onboard LNG storage tanks of the LNGC have been emptied or until a shutdown of the one or more LNGC cargo pumps.

In embodiments, the facility control system further comprises programming or instructions configured to suspend the flow of stored LNG from the at least one LNG storage mechanism when the storage capacity of the at least one LNG storage mechanism exceeds an established threshold capacity, and direct the LNGC to restart the one or more LNGC cargo pumps to continue to offload LNG from the LNGC.

In embodiments, of the regasification facility the at least one LNG storage mechanism comprises a storage capacity less than an LNG cargo capacity of the at least one LNGC. In some embodiments, the regasification facility can further comprise a gas return coupled to the at least one LNG storage mechanism and configured to selectively return LNG from the at least one LNG storage mechanism to the at least one LNGC.

In embodiments, the at least one LNG storage mechanism comprises a storage capacity less than an LNG cargo capacity of at least one LNGC.

In embodiments, diverting the second portion of the flow of LNG to the at least one LNG storage mechanism comprises diverting a selected volume of LNG of the flow of LNG in excess of a regasification rate of the at least one regasification system.

In embodiments, diverting the second portion of the flow of LNG to the at least one LNG storage mechanism comprises diverting a selected volume of LNG of the flow of LNG in excess of a regasification rate of the at least one regasification system.

In some embodiments, the method further comprises redirecting a portion of the fuel gas, the boil off gas, or otherwise vaporized gas, or combinations thereof, to the LNGC.

In embodiments, the method further comprises transferring fuel gas, from the at least one LNG storage mechanism to a natural gas export or output delivery system.

In embodiments, the method further comprises burning fuel gas, boil off gas, or otherwise vaporized gas to generate heat for vaporization of the LNG.

Other aspects of the present disclosure include a regasification facility comprising an intake system adapted to receive a flow of LNG from at least one LNGC; at least one LNG storage mechanism in communication with the intake system; at least one regasification system including one or more vaporizers in communication with the intake system and each including piping passing through at least one heating chamber and though which a volume of LNG is moved; wherein as the flow of LNG moves through the at least one heating chamber, the LNG is heated to convert the LNG to a regasified natural gas; and at least one gas metering system downstream from the one or more vaporizers and configured to receive and meter the regasified natural gas for export from the regasification facility; and wherein the intake system is adapted to supply a first portion the flow of LNG directly from the LNGC to the at least one regasification system, the first portion of the flow of LNG being substantially equivalent to a regasification capacity of the at least one regasification system, and divert a second portion of the flow of LNG from the at least one LNGC to the at least one LNG storage mechanism.

In embodiments, the at least one LNG storage mechanism comprises a storage capacity less than an LNG cargo capacity of the at least one LNGC, but which is sufficient to supply a substantially continuous supply of LNG to the at least one regasification system for a selected time period while the flow of LNG from the LNGC is interrupted.

In embodiments, the at least one LNG storage mechanism can comprise one or more, or any combination of, an LNG storage tank, LNG ISO container, FSUs, floating barges, or other onshore or offshore storage apparatus, or combinations thereof, that are configured, combined, fabricated, or otherwise operable as an LNG storage mechanism.

In embodiments of the regasification facility, further comprising at least one gas metering system; and wherein the at least one LNG storage mechanism, the one or more vaporizers and at least one heating chamber of the at least one regasification system and the at least one gas metering system comprise modular components configured to be fabricated at a location remote from the regasification facility.

In some embodiments, the regasification facility can include or be in fluid communication with a regasification terminal, the regasification terminal including an offload system; the at least one LNGC comprises at least one ship having one or more onboard LNG storage tanks and one or more pumps; and wherein when the at least one ship is received at the regasification terminal, the offload system is configured to receive the LNG from the one or more onboard storage tanks and transfer the LNG to the intake system.

In embodiments, the regasification facility can further comprise a gas return coupled to the at least one LNG storage mechanism and configured to selectively return LNG from the at least one LNG storage mechanism to the at least one LNGC.

Accordingly, the present disclosure provides embodiments of a regasification facility, and to systems, and methods of operation thereof, which enable the regasification facility to be constructed with shorter construction times and reduced construction costs while still enabling an efficient offloading and regasification of LNG from LNGCs. In addition, the flexible construction of the regasification facility enables the facility to be scaled up as needed to evolve with LNG supply markets and demand for LNG, while addressing many inefficiencies of LNG supply chain operations.

Various aspects, advantages and features of the present disclosure further will become apparent to those skilled in the art upon a review of the following detail disclosure, when taking in conjunction with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

To promote an understanding of the principles of the disclosure, reference will now be made to the features illustrated in the drawings and specific language will be used to describe the same. It will nevertheless be understood that no limitation of the scope of the disclosure is thereby intended. Any alterations and further modifications, and any further applications of the principles of the disclosure as described herein are contemplated as would normally occur to one skilled in the art to which the disclosure relates. For the sake clarity, some features not relevant to the present disclosure may not be shown in the drawings.

A flexible regasification facility, regasification systems and associated methods for offloading and regasification of liquified natural gas will now be described. In general, the regasification facility is designed to provide a flexible solution that enables import, offloading and regasification of LNG from visiting LNG carriers before being exported to a natural gas transmission system or grid. The regasification facility 5 can be designed and constructed using more modular components, such as at least one LNG storage mechanism 40 that can be prefabricated at off-site locations and assembled with other components of a regasification system 30 of the regasification facility, to enable construction of the regasification facility with reduced cost and time of construction.

In embodiments, the regasification facility 5 can be constructed with a capacity of about 600 million standard cubic feet (MMScfd), with a peaking capacity of about 800 MMScfd. However, the construction of the regasification facility enables this capacity to be scalable both up and down. For example, in embodiments, the regasification facility can have an initial regasification capacity of about 100 MMScfd and can be scalable all the way up to about 3 billion standard cubic feet per day (BCF/D) capacities, which, in embodiments, can be done by changing the number of vaporizers and the total onshore storage needed. Due to its already efficient use of land, as long as there is sufficient space the facility can be expanded to higher regasification rates to meet future demands. In addition, even at 3 BCF/D capacity and associated storage therefor per the principles of the present disclosure, the footprint of the regasification facility 5, and time and costs for construction typically are still significantly smaller than that of a traditional land based facility.

In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As one of ordinary skill would appreciate, different persons may refer to the same feature or component by different names. This document does not intend to distinguish between components or features that differ in name only. The figures are not necessarily to scale. Certain features and components herein may be shown exaggerated in scale or in schematic form and some details of conventional elements may not be shown in the interest of clarity and conciseness. When referring to the figures described herein, the same reference numerals may be referenced in multiple figures for the sake of simplicity. In the following description and in the claims, the terms "including" and "comprising" are used in an open-ended fashion, and thus, should be interpreted to mean "including, but not limited to."

As used in this specification and the appended claims, the singular forms "a," "an" and "the" include plural referents unless the context clearly dictates otherwise. Thus, for example, reference to a heat exchanger includes one or more heat exchangers.

"Coupled" refers to either a direct connection or an indirect connection (e.g., at least one intervening connection) between one or more objects or components. The phrase "directly attached" means a direct connection between objects or components.

As used herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numeral ranges provided. Accordingly, these terms should be interpreted as indicating that insubstantial or inconsequential modifications or alterations of the subject matter described and are considered to be within the scope of the disclosure.

Figure 1A:
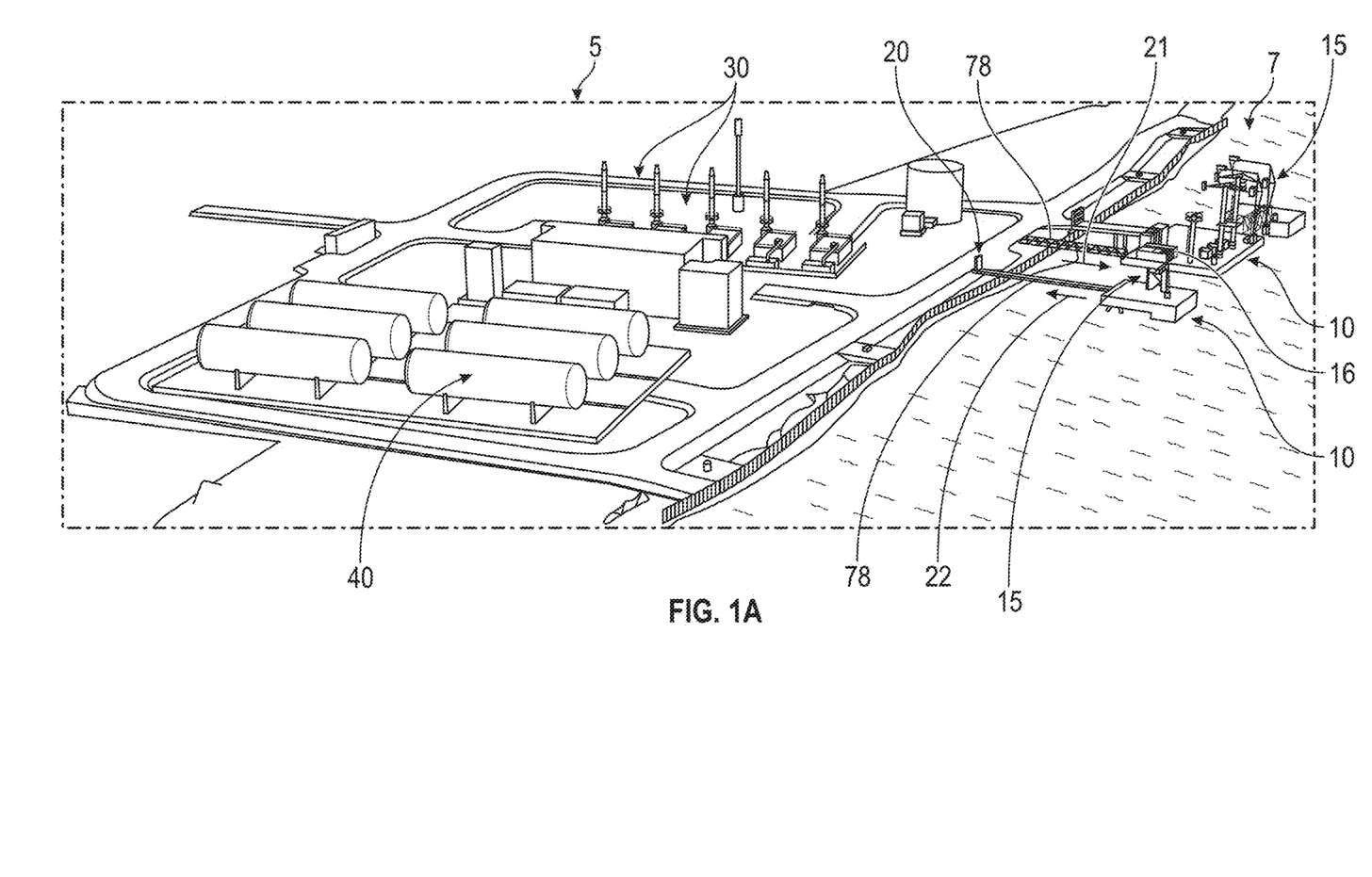
FIGS. 1A and 1B are schematic illustrations of an example embodiments of regasification facilities according to the principles of the present disclosure.
Figure 1B:
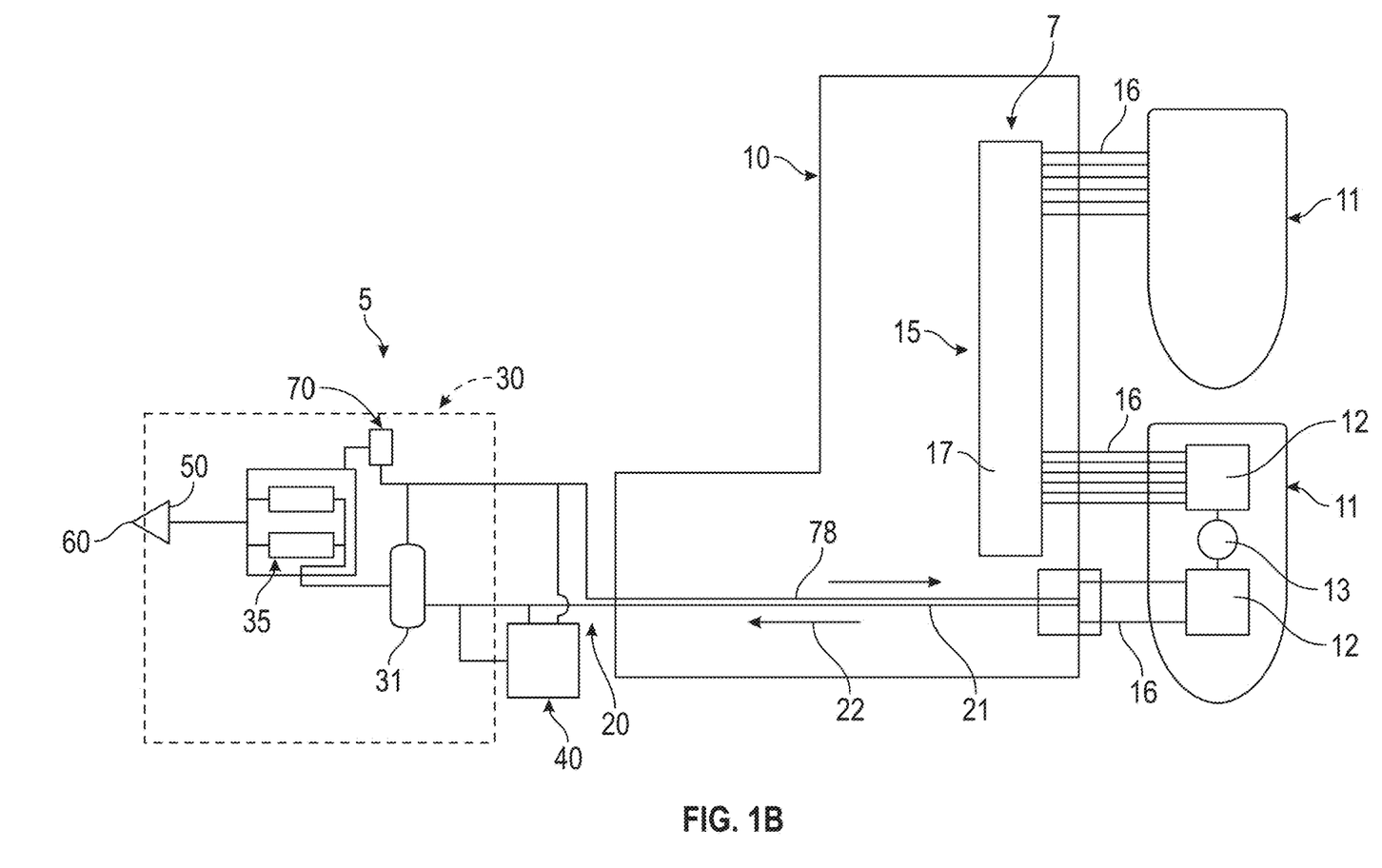

In embodiments, as generally shown in FIGS. 1A-1B, the flexible regasification facility 5 can be constructed adjacent a regasification terminal 7 at which one or more LNGC's can be received for offloading a cargo of LNG to one or more regasification systems of the regasification facility 5. In embodiments, the regasification terminal can includes a dock or mooring facility 10, and an LNG offloading system 15. In addition, in embodiments, the regasification facility 5 can include an intake system 20 connected to the LNG offloading system 15 and to the regasification system 30 located onshore; and one or more onshore LNG storage mechanisms 40 connected to the regasification system 30 and the intake system 20. In some embodiments, the regasification facility 5 further can include at least one gas metering system 50 (FIGS. 2A-3) and a natural gas export or output delivery system 60 for export of regasified natural gas to a delivery pipeline or natural gas transmission system or grid. Operation of the regasification facility 5 can be monitored and controlled by a facility control system 55.

In embodiments, as illustrated in FIG. 1B, an LNGC 11 (or, in some embodiments, multiple LNGCs) carrying a cargo of LNG can dock at the mooring terminal 10 for offloading its cargo of LNG. The LNGC typically will have a series of onboard LNG storage tanks 12 in which the LNG is stored and maintained in its liquid state at or close to atmospheric pressures. The LNGC further generally can include one or more onboard pumps 13 operable to pump the LNG from the tanks. As will be understood, a mooring terminal or dock, as used herein, can include a dock, jetty, or other structure adapted to receive an LNGC.

The offloading system 15 generally can be located at the mooring facility, and embodiments, can include conduits or piping 16 that can be connected to the onboard storage tanks 12 of the LNGC, and to one or more conduits or pipelines 21 of the intake system 20 of the regasification facility 5. As will be understood, various arrangements or components can be used as part of the offloading system 15 for transfer or LNG between the LNGC and the intake system 20 of the regasification facility. For example, in some embodiments such as indicated in FIG. 1A, the offloading system can include cryogenic loading arms, flexible or rigid piping or conduits and/or other offloading equipment or systems as understood by those skilled in the art. In addition, in some embodiments, the offloading system also can include a manifold 17 between the LNGC and the intake system, e.g., being located along or adjacent the mooring terminal, and can act as a temporary storage or buffer for the supply of the LNG to the intake system.

As generally illustrated in FIGS. 1B-3, LNG will be pumped from the onboard LNG storage tanks 12 of the LNGC using the pumps thereof, and fed along conduits or piping 16 of the offloading system 15 to the intake system 20, as indicated by arrow 22. As further illustrated in FIGS. 2A-3, in embodiments, the flow 22 of incoming LNG from the LNGC can be measured and controlled, including being shut down or stopped as needed, such as via a control valve 23 located along the intake or pipeline 21 of the intake system, and which is operable to control the flow of LNG into and through the intake system. In embodiments, the control valve 23 can comprise an emergency shutdown valve controlled by the facility control system 55.

In embodiments, the incoming flow of LNG from the LNGC can be controlled such that a first portion of the flow of LNG can be fed directly to the regasification system 30, as indicated by arrow 25, while a second portion of the flow of LNG can be diverted, as indicated by arrow 26, and fed to at least one LNG storage mechanism 40. In some embodiments, a bypass flow control valve 27 can be located along the intake pipeline 21 downstream from the junction 28 between the intake pipeline and an inlet conduit for the at least one LNG storage mechanism, and can be controlled to selectively vary or shut off the direct feeding of LNG from the LNGC to the regasification system 30 as needed.

It will be understood that the design and construction of the regasification facility 5 according to principles of the present disclosure, enables the regasification facility to be constructed with one or more LNG storage mechanisms 40, as well as providing for the installation of additional LNG storage mechanisms at the regasification facility site as needed for scaling up of the production capacities of the regasification facility. For example, FIGS. 1B-3 schematically illustrate embodiments of a regasification facility including the use of at least one LNG storage mechanism 40, while FIG. 1A illustrates an example embodiment that can include the use of multiple LNG storage mechanisms 40.

Figure 2A:
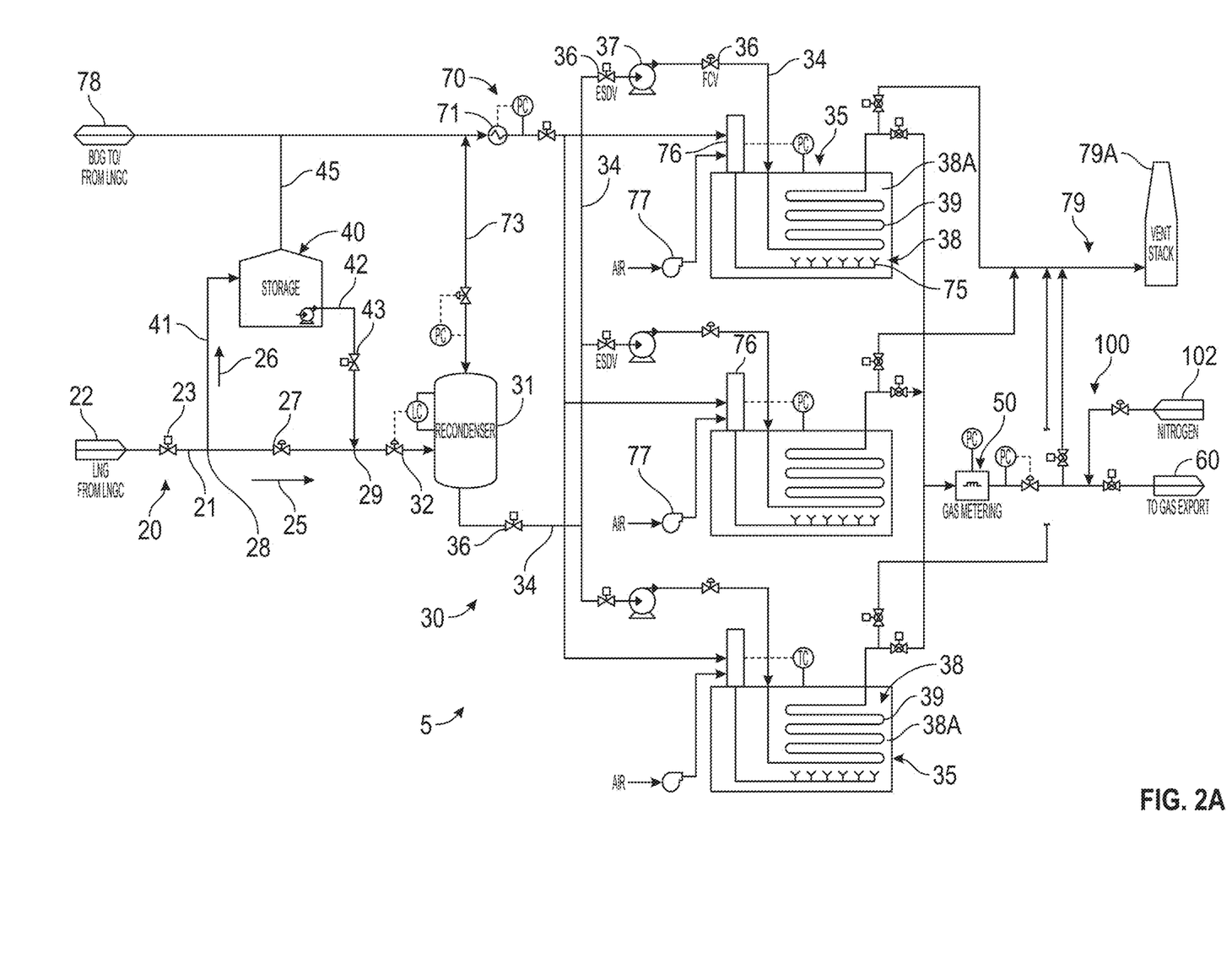
FIGS. 2A and 2B are schematic illustrations of embodiments of the regasification facility and a process for offloading and regasification of LNG from an LNGC according to the principles of the present disclosure.
Figure 2B:
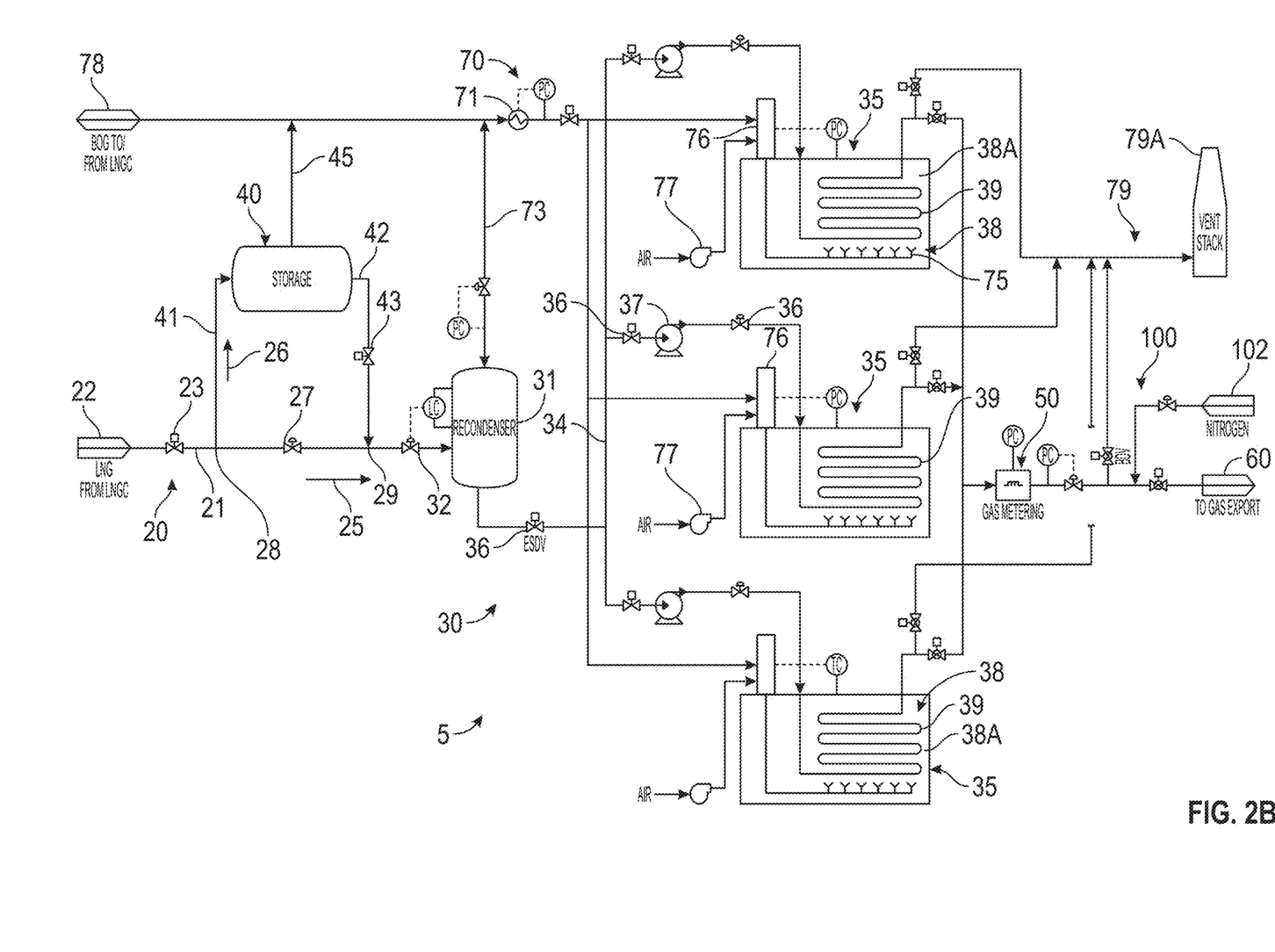
Figure 3:
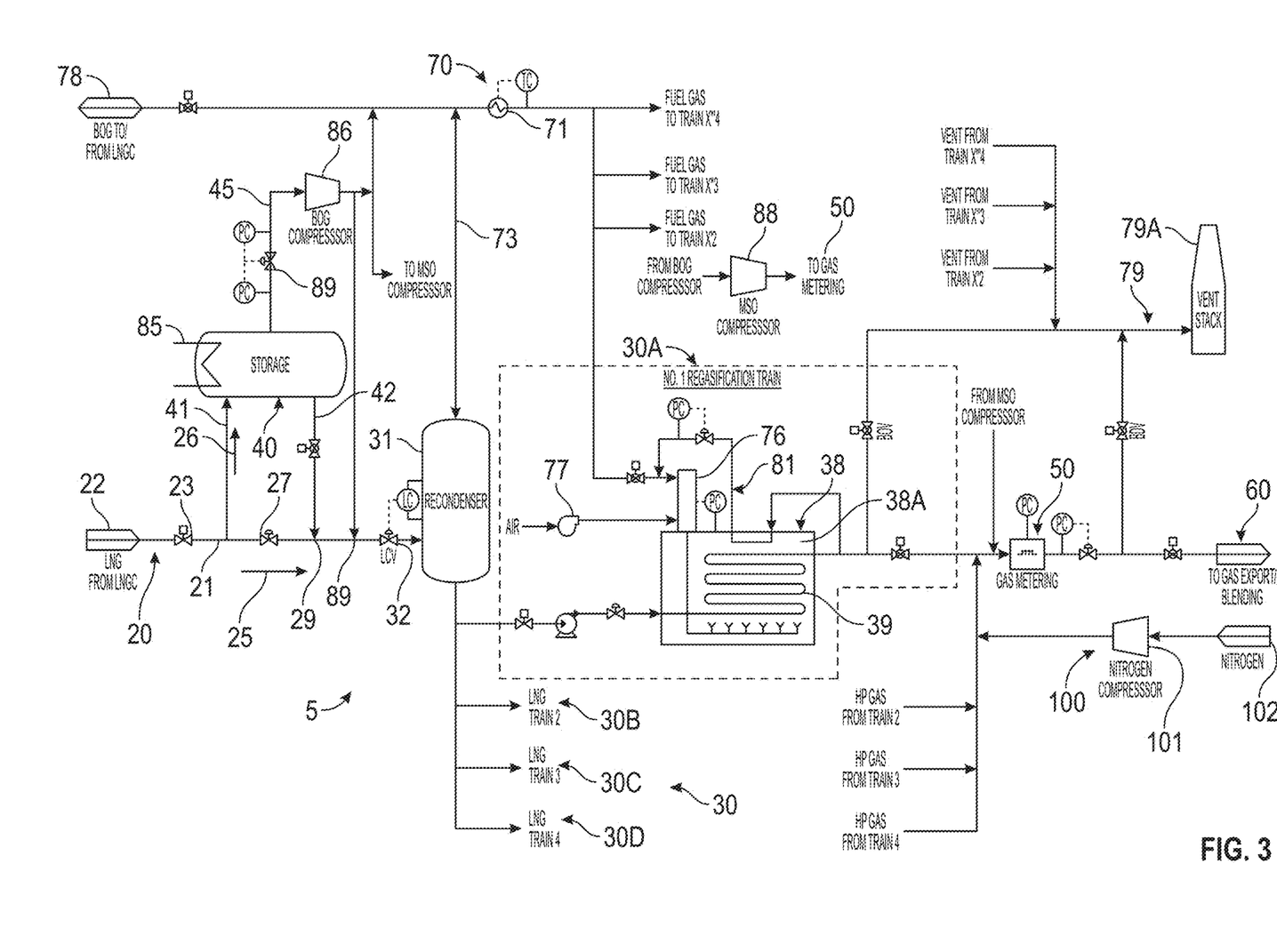
FIG. 3 is a schematic illustration of another embodiment of the regasification facility and a process for offloading and regasification of LNG from an LNGC according to the principles of the present disclosure.

In addition, it will further be understood by those skilled in the art that various types of LNG storage mechanism can be used. For example, in embodiments, the at least one LNG storage mechanism 40 can comprise an LNG storage tank, which can include prefabricated modular constructed membrane storage tanks or similar tanks configured to store LNG under pressure in a liquid state such as illustrated in FIG. 2A, a LNG ISO container, FSUs, floating barges, or other onshore or offshore storage apparatus including tanker trucks, or combinations thereof, that are configured, combined, fabricated, or otherwise operable as an LNG storage mechanism for storing volumes of LNG under pressure and with the LNG maintained at temperatures sufficient to keep the LNG is a substantially liquid state prior to introduction to the regasification system 30. FIGS. 2B and 3 illustrate embodiments of the regasification facility 5 in which the at least one LNG storage mechanism 40 is shown as a bullet storage tank.

As noted, with the modular construction and design of the regasification facility, the at least one LNG storage mechanism 40 of the regasification facility 5 can be prefabricated, for example, being manufactured at a variety of different locations and using a variety of different manufacturers, and can be delivered and installed on site without having to construct large scale LNG storage tanks at the regasification site as traditionally required with land-based regasification systems. In embodiments, the at least one LNG storage mechanism 40 can be constructed with a reduced storage capacity that would be lower than the cargo storage capacity of a traditional LNGC. For example, in embodiments, the at least one LNG storage mechanism 40 can have a capacity that is less than approximately 140,000 cubic meters of LNG (m3 LNG), and which is substantially less than traditional on shore large scale LNG storage mechanism.

The lower capacity of the at least one LNG storage mechanism 40 of the regasification facility 5 can facilitate the offsite prefabrication of such LNG storage mechanisms 40 as modular components, as well as their transport and installation at the regasification site, which in turn can enable more efficient construction and scaling up of the capacity of the regasification facility as needed.

In embodiments, the at least one LNG storage mechanism 40 can be configured with a minimum selected storage capacity that can be based upon, for example, a capacity needed to supply a flow of LNG sufficient for operation of the regasification system 30 at a base or minimum regasification rate for a selected time period. For example, the at least one LNG storage mechanism 40 can be provided with a storage capacity sufficient to supply approximately 6 to 8 hours' worth of LNG to the regasification system. Other greater or lesser storage capacities also can be provided to supply LNG at sufficient rates to enable greater or lesser operating times of a regasification system. For example, in some embodiments, multiple LNG storage mechanism can be installed, each of which could be selectively filled with a volume of LNG and selectively engaged to provide a flow of LNG to maintain operation of the regasification system for longer periods as needed.

Still further, in embodiments, the use of at least one selected lower capacity onshore LNG storage mechanism 40 enables additional flexibility in the operation of the regasification facility. For example, by controlling the diversion of the second portion 26 of the flow of LNG coming from the LNGC to the at least one LNG storage mechanism 40, while the remaining portion of the flow of LNG is fed directly to the regasification system, the pumps of the LNGC can be operated at peak or normal capacity. At lower regasification rates such as 500 MMSCF/D (equivalent to 1,000 m3 LNG/hr.), a single cargo pump for an LNGC can deliver anywhere from 1,300 to 1,800 m3 LNG/hr. of LNG, which can exceed the volume of LNG that the regasification system 30 can process.

Previously, to run such an LNGC pump at a lower rate to match the capacity of the regasification system, the pump would have to operate in recirculation mode, meaning that some of the liquid that is pumped is actually returned to the LNGC tanks. This eventually causes a warming of the cargo and is not the preferred method of operation for most vessel operators as they prefer to manage their tank pressures quite closely. To avoid this type of operation, the present regasification facility enables excess LNG that isn't needed for regasification to be directed to the onshore LNG storage mechanism 40, allowing the LNGC pump to operate at its rated capacity.

In embodiments, when the at least one LNG storage mechanism is substantially filled with LNG or has reached a selected threshold storage volume (e.g., the at least one storage mechanism is filled to capacity or at least meets or exceeds an established threshold capacity) established as an amount or volume of LNG needed to be available for regasification operations for at least a selected time period, a regasification facility operator can be alerted and have the option to elect (i) to shut down the LNGC cargo pumps and the regasification facility can be fed by the at least one LNG storage mechanism until it has been emptied or the volume of LNG therein falls below an established threshold capacity or otherwise as directed by the regasification facility operator, at which time the LNGC can restart its pumps to continue to offload its cargo of LNG, or (ii) to operate the LNGC cargo pumps until the LNGC onboard LNG storage tanks are emptied of their cargo of LNG or until the LNGC cargo pumps are otherwise shut down, at which time the regasification facility can be fed by the at least one LNG storage mechanism.

In some embodiments, the regasification facility can have a facility control system that can include one or more processors and programming or instructions configured to alert a facility operator of a potential disruption of the supply flow of LNG (e.g., due to a shutdown of one or more LNG cargo pumps, or substantially emptying of at least one LNG storage mechanism of its stored volume of LNG). For example, in embodiments, the facility control system of the regasification facility can communicate with the LNGC and/or monitor the incoming flow of LNG and a remaining storage of the at least one LNG storage mechanism. In embodiments, if the facility control system detects or determines that the at least one LNG storage mechanism is substantially filled with LNG or has reached an established threshold capacity or amount of LNG selected for maintaining regasification operations for a time period (e.g., four to eight hours or more); or if a potential disruption of the supply of LNG into the regasification system is determined, for example, if a pump shut down event is communicated from the LNGC to the facility control system, or a stored volume of LNG within the at least one LNG storage mechanism is detected or determined to be reaching an established threshold capacity, the facility control system can automatically transfer the supply of LNG to the regasification system 30 from the LNG provided directly from an LNGC.

In other embodiments, upon detection of the at least one storage mechanism reaching an established threshold capacity, a potential disruption or fault condition, the facility control system can provide the facility operator the option to pull or feed LNG from one or more additional LNG storage mechanisms to continue regasification operations in the event the LNGC shuts down the LNG cargo pumps and ceases its cargo operations for a certain period of time, allows for the LNGC operator to carry out maintenance, or other scheduled or unscheduled events requiring downtime.

For higher regasification rates, the same principle can be applied, with more LNGC pumps in operation and with the regasification facility being scaled up to provide a larger storage capacity to accommodate the higher LNG usage needed at those regasification rates while the crew rests. For example, at a 3 BCF/D capacity, the LNGC can unload a cargo of LNG at similar rates to that of a traditional onshore facility. In addition, having some onshore storage allows the facility to keep a certain additional quantity of LNG onsite, which can be used to cool down equipment prior to its use after idle periods.

In embodiments, as illustrated in FIGS. 2A and 2B, the at least one LNG storage mechanism 40 further can be connected the intake system 20 by conduits or piping, including an upstream or inlet conduit 41 along which the second portion 26 of the flow of LNG is diverted and introduced into the at least one LNG storage mechanism, and a downstream or outlet conduit 42 extending from the at least one LNG storage mechanism 40 and coupled to the intake pipeline 21 at a junction indicated at 29, and through which LNG can be supplied from the at least one LNG storage mechanism back to the intake system 20 for supply to the regasification system 30. In embodiments, a pump can be coupled to the at least one LNG storage mechanism for pumping the LNG therefrom, and at least one controllable valve 43 (e.g., an emergency shutdown valve), can be positioned along the outlet conduit 42 and selectively controlled by the facility control system, for controlling the flow of LNG from the at least one LNG storage mechanism 40 back to a conduit of the intake system 20 for supply to the regasification system.

In addition, as further illustrated in FIGS. 2A-3, in embodiments, the regasification system 30 can include a re-condenser 31 arranged between the intake system 20 and the regasification system 30. The re-condenser 31 will be configured to recondense at least a portion of the boil off gas through direct contact heat transfer from the intake of the LNG, converting the boil off gas back into LNG so that it can be pressurized with the direct flow of LNG to be supplied to the regasification system. As further indicated in FIGS. 2A-3, any remaining fuel gas, boil off gas, or otherwise vaporized gas (collectively, referred to herein as "fuel gas") can be diverted from the re-condenser 31 to a fuel gas heating system 70 of the regasification system 30. In embodiments, a flow control valve 32 can be located upstream from the re-condenser, e.g., between the re-condenser and the junction 29 between the outlet conduit 42 of the at least one LNG storage mechanism and the intake pipeline 21 of the intake system.

In addition, in some embodiments, a suction drum also can be provided, and can be configured to act as a buffer tank for storing LNG for feeding to one or more vaporizers of the regasification system 30, to help ensure the regasification pumps of the regasification system do not run dry. In embodiments, a suction drum can be provided in addition to or without a re-condenser, such as indicated in FIG. 3. In other embodiments, the suction drum can be provided with the re-condenser as a single unit, such as indicated in FIGS. 2A-2B (though both the suction drum and the re-condenser also can comprise separate units or components). In embodiments where a suction drum is utilized (separately or together with the re-condenser), the flow control valve 32 can include a level control valve or similar valve operable to shut off the intake pipeline from the suction drum/re-condenser as needed.

In addition, the regasification system 30 can include one or more vaporizers 35 each configured to apply heat to a flow of LNG passing therethrough to raise the temperature of the LNG sufficient to convert the LNG back to its gaseous form, resulting in regasified natural gas. The one or more vaporizers 35 can be connected to the suction drum/re-condenser 31 via piping or conduits 34. In embodiments, one or more control valves 36 (e.g., emergency shutdown valves) and pumps 37, can be arranged along the conduits 34 so as to control feeding of the LNG from the suction drum/re-condenser into and through an associated vaporizer.

In embodiments, various types of vaporizers 35 can be used. For example, FIGS. 2A-3 illustrate embodiments with submerged combustion vaporizers, while in other embodiments, other types of vaporizers, including ambient air vaporizers and open rack vaporizers, also can be used. In the embodiments shown, submerged combustion vaporizers 35 are provided, with the vaporizers each including a heating chamber 38, which, in embodiments as indicated in FIG. 2. 2A-3, can include a liquid bath 38A, in which sections of coiled piping 39 are received. As the LNG flows through the coiled piping 39, the liquid bath 38A is heated via combustion of boil off gas, with the heat transferred to the LNG causing it to regasify. The regasified natural gas thereafter can be fed to the downstream metering station 50 which can analyze and control the export or discharge of the natural gas to the natural gas export or output delivery 60 for discharge of the gaseous state natural gas, such as to a pipeline, a transport such as a tanker truck or other transport, or a gas supply grid.

As additionally illustrated in FIGS. 2A-3, in embodiments, the fuel gas heating system 70 of the regasification system 30 will be connected to the one or more vaporizers 35. In embodiments, the heating system 70 generally will include at least one gas fuel heater 71, adapted to receive and heat boil off gasses generated in the system for combustion by the vaporizers for heating the LNG passing therethrough. Such boil off gas normally is generated within the at least one LNG storage mechanism 40, as well as in the LNGC's LNG storage tanks due to natural heat ingress as the LNG flow is pumped out the LNGC's LNG storage tanks.

As indicated in FIGS. 2A-3, in embodiments, the boil off gas generated in the LNG storage tank or at least one LNG storage mechanism 40 can be supplied via a boil off gas line 45 to a gas line 72 along which the boil off gas will be directed to the gas heater 71 of the heating system. In addition, in embodiments, additional boil off gas generated through direct contact with the LNG flows through the intake system can be at least partially recondensed as it passes through the suction drum/re-condenser 31, with any remaining boil off gas being exhausted directed from the suction drum/re-condenser to the heating system, as indicated at 73.

The one or more heaters 71 of the heating system 70 generally can be configured to heat or compress the fuel gas, which heated fuel gas can be used by the vaporizers, e.g., being combusted as indicated at 75, in order to heat the heating chamber 38, e.g., heat the liquid bath 38A, of each of the one or more vaporizers. For example, in some embodiments, as shown in FIGS. 2A-2B, the heated fuel gas can be directed into a manifold 76 coupled to each vaporizer and mixed with air supplied by a blower 77 to help facilitate combustion of the fuel gas within each vaporizer for heating the LNG flowing therethrough.

In addition, as further indicated in FIGS. 2A-3, in some embodiments, excess fuel gas can be directed back to an LNGC along a gas return 78 where it can be used as a further fuel source for driving operation of pumps and/or other systems of the LNGC. In addition, the regasification system 30 can further include a venting and/or flaring system 79, which can include a vent and/or flare stack 79A for venting and/or flaring natural gas in the event of an emergency situation or pre-planned maintenance periods.

FIG. 3 illustrates an additional embodiment of the regasification facility 5. In this embodiment, the regasification facility 5 can be constructed as a modular facility, including use of one or more LNG storage mechanisms 40 that may be prefabricated or built offsite, and then transported and installed at the regasification site, and may include one or more regasification systems or trains 30A-30D, each constructed as a separate module or system that can be installed as needed to expand the scale of the production capacity of the regasification facility. By way of example, FIG. 3 illustrates a regasification facility that can include a four-train configuration (e.g., a 4×200 MMScfd train configuration), although other train configurations and capacities also may be provided.

In some embodiments, as shown in FIG. 3, each of the regasification systems or trains 30A-30D can include a vaporizer 35, such as a submerged combustion vaporizer connected to an LNG pump 37, a hot air blower 77 and to the fuel gas heating system 70. In addition, in some embodiments, the regasification trains further can be connected to an alternative source of fuel gas that can be supplied to the vaporizer of the regasification train for combustion, as indicated at 81 in FIG. 3. Such alternative fuel sources can include additional vapor or gas from other sources, or which can be captured downstream from the vaporizer, e.g., such as from a send-out line going to the natural gas export or output delivery system, and which can be redirected back to the vaporizer so as to provide an additional source of fuel for combustion which is more efficient than using a separate compressor to pressurize the boil off gas for combustion.

In addition, as further illustrated in the embodiment of FIG. 3, the one or more LNG storage mechanisms 40 can include a series of LNG storage tanks or other LNG storage mechanisms that can be varied and connected in series by common liquid/vapor/vent headers. In addition, in embodiments, an LNG storage mechanism 40 can include a heater 85, such as a heating coil, for providing forced vaporization and tank pressurization of the LNG in the LNG storage mechanism as needed. Further, in embodiments, the boil off gas base exhaust line 45 for the LNG storage mechanism 40 can be linked to a boil off gas compressor 86 adapted compress the boil off gas exhausted from the LNG storage mechanism 40, so as to cause at least a portion of the boil off gas to recondense to provide LNG that can be added back to the intake system via a re-condenser 87. Any remaining boil off gas can then be provided to the reheating system.

In addition, in embodiments, the boil off gas from the LNG storage mechanism can be separated with a portion being fed to the fuel gas heating system 70, and with an additional portion being fed to an MSO compressor 88 that can deliver high pressure gas to the natural gas export or output delivery system. The flow of boil off gas to the boil off gas compressor from the LNG storage mechanism further can be controlled by a control valve 89 that can be operable under control of the facility control system 55 to regulate and control the LNG storage mechanism operating pressure and fuel gas supply pressure of the boil off gas and/or fuel gas being fed to the fuel gas heating system 70.

The LNG is pressurized via multi-stage cryogenic high pressure pumps before being fed to the vaporizers LNG inlet. As the liquid bath is heated, heat is transferred to the LNG passing through the coiled piping sections 39 that are submerged in the water bath, causing the LNG to transition back to its gaseous state. Thereafter, the vaporized natural gas is supplied under pressure to the gas metering system 50, which analyzes and controls the release of the natural gas to the natural gas export or output delivery 60 for supply to a natural gas transmission pipeline, system, a transport such as a tanker truck, or to a gas supply grid.

All gas delivered from the regasification facility generally will be fiscally metered, which, in embodiments, can include at least one fiscal grade flow meters (e.g., ultrasonic) and an inline chromatography system for accurate gas delivery information to the network operators. In addition, if the exported natural gas to be delivered is out of the gas network specifications in terms of its Wobbe Index or heat content, the gas can be ballasted utilizing nitrogen injection to lower its heating value and subsequently Wobbe Index or if available, blended into an existing gas stream with appropriate specifications such that the result is acceptable for the gas network transmission systems. This allows for the regasification facility to accept nearly any LNG cargo from around the world which increases its potential for utilization.

For example, as additionally illustrated in FIGS. 2A-3, in embodiments, the regasification system further can be connected to a nitrogen intake system 100, which can include a nitrogen compressor 101 and a source of nitrogen 102. In some embodiments, as needed, nitrogen can be injected into the high pressure natural gas and blended therewith as needed to adjust the quality of the exported natural gas and meet local regulations. The introduction and blending of nitrogen with the natural gas can be done upstream or downstream of the gas metering system 50. In addition, in further alternative embodiments, such blending can be done downstream, for example, with the exported natural gas being blended with locally sourced natural gas.

In operation, in embodiments, the regasification facility can receive a supply of LNG from an LNGC, with the flow of LNG being received at substantially full delivery rates from the LNGC, enabling the pumps of the LNGC to operate at their optimal capacity. As the LNG is supplied along the intake system, the flow of LNG can be selectively divided, with a first portion going directly to the regasification system, and a second portion being diverted to at least one LNG storage mechanism. The first portion of LNG can comprise a volume/flow approximately equal to the regasification rates of the regasification system, with any excess LNG being diverted to the at least one LNG storage mechanism.

In embodiments, once the LNG storage mechanism is substantially full or otherwise established as available for regasification operations, the regasification facility operator can have the option to control and switch or transfer the supply of LNG from a direct feed of LNG from one or more LNGCs at the regasification terminal or from at least one LNG storage mechanism. For example, In embodiments, a facility control system of the regasification facility can include programming or controls configured to enable the operator to elect (i) to shut down the LNGC cargo pumps and the regasification facility can be fed by the at least one LNG storage mechanism until it has been emptied or otherwise as directed by the regasification facility operator, at which time the LNGC can restart its pumps to continue to offload its cargo of LNG, or (ii) to operate the LNGC cargo pumps until the LNGC onboard LNG storage tanks are emptied or until the LNGC cargo pumps are otherwise shut down, at which time the regasification facility can be fed by the at least one LNG storage mechanism. This cycle may repeat as required by the regasification operation until the LNGC is empty, effectively having the LNGC act as a temporary floating storage unit.

In embodiments, the LNG can be delivered to the storage tanks at a pressure between 0.5 and 5 barg. The LNG that is utilized in the regasification facility is delivered into the intake system upstream of one or more regasification trains by either the LNGC cargo pumps or pumps connected to the LNG storage mechanism, and then can be pressurized by multi-stage cryogenic booster pumps before being fed into a vaporizer of a regasification train. The vaporizer uses a heat source to boil the LNG and deliver the natural gas at temperatures greater than 5° C. and pressures between 60 to 110 barg to a natural gas transmission system or grid.

As a result, the regasification facility can operate with much lower storage though, in some instances, the LNGC may remain alongside the facility for a longer period of time, much of which is dependent on the required regasification rates. By reducing the onshore storage the capital expenditure for the regasification facility is significantly reduced, and the overall operational costs are not meaningfully higher for shippers because LNG shipping routes over the year are often a combination of contractual liner service and tramp shipping in order to maximize profits. In those cases, the tramp service provides an inherent source of slack in their schedule.

The present disclosure has been described herein in terms of examples that illustrate principles and aspects of the present disclosure. The skilled artisan will understand, however, that a wide gamut of additions, deletions, and modifications, both subtle and gross, may be made to the presented examples without departing from the spirit and scope of the present disclosure.

The invention claimed is:

1. A regasification facility, comprising:
   an intake system adapted to receive a flow of LNG from at least one LNGC;

at least one LNG storage mechanism in communication with the intake system; and at least one regasification system including one or more vaporizers in communication with the intake system and each including at least one heating chamber though which a volume of LNG is moved for conversion of the LNG to regasified natural gas;

wherein the intake system is configured to direct at least a first portion of the flow of LNG from the LNGC directly to the at least one regasification system and selectively divert a second portion of the flow of LNG from the at least one LNGC to the at least one LNG storage mechanism;

a facility control system including programming or instructions configured to monitor (1) the second portion of the flow of LNG being diverted to the at least one LNG storage mechanism and (2) a storage capacity of the at least one LNG storage mechanism and selectively:

(a) direct the LNGC to shut down one or more LNGC cargo pumps and supply a flow of stored LNG to the at least one regasification system from the at least one LNG storage mechanism when a level of LNG within the at least one LNG storage mechanism exceeds an established threshold capacity; or (b) suspend diversion of the second portion of LNG to the at least one LNG storage mechanism, and continue to operate the one or more LNGC cargo pumps (i) until one or more onboard LNG storage tanks of the LNGC are emptied or (ii) until a shutdown of the one or more LNGC cargo pumps; and wherein the at least one LNG storage mechanism comprises a storage capacity sufficient to supply a volume of LNG to the at least one regasification system for a selected time period.

2. The regasification facility of claim 1, wherein the at least one LNG storage mechanism comprises at least one LNG storage tank, LNG ISO container, floating storage unit (FSU), floating barge, or other onshore or offshore storage apparatus that are configured, combined, fabricated, or otherwise operated as an LNG storage mechanism, or a combination thereof.

3. The regasification facility of claim 1, wherein the at least one regasification system comprises one or more regasification modules fabricated on, installed on, or otherwise configured with one or more onshore facility, floating barge, FSRU, floating platform vessel, or other onshore or offshore storage apparatus that are configured, combined, fabricated, or otherwise operated as a regasification system, or a combination thereof.

4. The regasification facility of claim 1, further comprising at least one gas metering system; and wherein the at least one LNG storage mechanism, the one or more vaporizers and at least one heating chamber of the at least one regasification system and the at least one gas metering system comprise modular components configured to be fabricated at a location remote from the regasification facility.

5. The regasification facility of claim 1, wherein the at least one LNGC comprises at least one ship having one or more onboard LNG storage tanks and one or more pumps in communication with the intake system for pumping the flow of LNG from the one or more onboard LNG storage tanks into the intake system.

6. The regasification facility of claim 1, wherein the facility control system further comprises programming or instructions configured to suspend the flow of stored LNG from the at least one LNG storage mechanism when the storage capacity of the at least one LNG storage mechanism exceeds an established threshold capacity, and direct the LNGC to restart the one or more LNGC cargo pumps to continue to offload LNG from the LNGC.

7. The regasification facility of claim 1, wherein the at least one LNG storage mechanism comprises a storage capacity less than an LNG cargo capacity of at least one LNGC.

8. The regasification facility of claim 1, further comprising a gas return coupled to the at least one LNG storage mechanism and configured to selectively return LNG from the at least one LNG storage mechanism to the at least one LNGC.

9. The regasification facility of claim 1, further comprising a fuel gas heating system in communication with the intake system and configured to heat boil off gas for combustion by the one or more vaporizers.

10. The regasification facility of claim 1, further comprising a natural gas export or delivery system in communication with the least one LNG storage mechanism, the at least one regasification system, or a combination thereof, for output of the regasified natural gas.

11. A regasification facility, comprising:

an intake system adapted to receive a flow of LNG from at least one LNGC;

at least one LNG storage mechanism in communication with the intake system; and at least one regasification system including one or more vaporizers in communication with the intake system and each including at least one heating chamber though which a volume of LNG is moved for conversion of the LNG to regasified natural gas; and a gas return coupled to the at least one LNG storage mechanism and configured to selectively return LNG from the at least one LNG storage mechanism to the at least one LNGC;

wherein the intake system is configured to direct at least a first portion of the flow of LNG from the LNGC directly to the at least one regasification system and selectively divert a second portion of the flow of LNG from the at least one LNGC to the at least one LNG storage mechanism; and wherein the at least one LNG storage mechanism comprises a storage capacity sufficient to supply a volume of LNG to the at least one regasification system for a selected time period.

12. The regasification facility of claim 11, wherein the at least one LNG storage mechanism comprises at least one LNG storage tank, LNG ISO container, floating storage unit (FSU), floating barge, or other onshore or offshore storage apparatus that are configured, combined, fabricated, or otherwise operated as an LNG storage mechanism, or a combination thereof.

13. The regasification facility of claim 11, wherein the at least one regasification system comprises one or more regasification modules fabricated on, installed on, or otherwise configured with one or more onshore facility, floating barge, FSRU, floating platform vessel, or other onshore or offshore storage apparatus that are configured, combined, fabricated, or otherwise operated as a regasification system, or a combination thereof.

14. The regasification facility of claim 11, further comprising at least one gas metering system; and wherein the at least one LNG storage mechanism, the one or more vaporizers and at least one heating chamber of the at least one regasification system and the at least one gas metering system comprise modular components configured to be fabricated at a location remote from the regasification facility.

15. The regasification facility of claim 11, wherein the at least one LNGC comprises at least one ship having one or more onboard LNG storage tanks and one or more pumps in communication with the intake system for pumping the flow of LNG from the one or more onboard LNG storage tanks into the intake system.

16. The regasification facility of claim 11, further comprising a facility control system including programming or instructions configured to monitor (1) the second portion of the flow of LNG being diverted to the at least one LNG storage mechanism and (2) a storage capacity of the at least one LNG storage mechanism and in response to the storage capacity of the at least one LNG storage mechanism falling below an established threshold capacity, selectively:
  (a) direct the LNGC to shut down one or more LNGC cargo pumps and supply a flow of stored LNG to the at least one regasification system from the at least one LNG storage mechanism when a level of LNG within the at least one LNG storage mechanism exceeds an established threshold capacity; or
  (b) suspend diversion of the second portion of LNG to the at least one LNG storage mechanism, and continue to operate the one or more LNGC cargo pumps (i) until one or more onboard LNG storage tanks of the LNGC are emptied or (ii) until a shutdown of the one or more LNGC cargo pumps.

17. The regasification facility of claim 16, wherein the facility control system further comprises programming or instructions configured to suspend the flow of stored LNG from the at least one LNG storage mechanism when the storage capacity of the at least one LNG storage mechanism exceeds an established threshold capacity, and direct the LNGC to restart the one or more LNGC cargo pumps to continue to offload LNG from the LNGC.

18. The regasification facility of claim 11, wherein the at least one LNG storage mechanism comprises a storage capacity less than an LNG cargo capacity of at least one LNGC.

19. The regasification facility of claim 11, further comprising a fuel gas heating system in communication with the intake system and configured to heat boil off gas for combustion by the one or more vaporizers.

20. The regasification facility of claim 11, further comprising a natural gas export or delivery system in communication with the least one LNG storage mechanism, the at least one regasification system, or a combination thereof, for output of the regasified natural gas.

* * * * *